(12) United States Patent
Chawla et al.

(10) Patent No.: US 12,026,542 B2
(45) Date of Patent: Jul. 2, 2024

(54) OPTIMIZING DEPLOYMENT OF MACHINE LEARNING WORKLOADS

(71) Applicant: International Business Machines Corporation, Armonk, NY (US)

(72) Inventors: Kunal Chawla, Atlanta, GA (US); Luis Angel Bathen, Placentia, CA (US); Divyesh Jadav, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 17/376,660

(22) Filed: Jul. 15, 2021

(65) Prior Publication Data

US 2023/0018535 A1 Jan. 19, 2023

(51) Int. Cl.
G06F 9/48 (2006.01)
G06N 20/00 (2019.01)
H04L 67/10 (2022.01)

(52) U.S. Cl.
CPC ............ *G06F 9/4843* (2013.01); *H04L 67/10* (2013.01); *G06N 20/00* (2019.01)

(58) Field of Classification Search
CPC ........ G06N 20/00; G06F 9/4843; H04L 67/10
See application file for complete search history.

(56) References Cited

U.S. PATENT DOCUMENTS

| 10,405,215 | B2 | 9/2019 | Tavares Coutinho | |
| 10,487,564 | B2 | 11/2019 | Rust | |
| 2018/0136655 | A1 | 5/2018 | Kim | |
| 2019/0196464 | A1* | 6/2019 | Lockwood | G05D 1/0016 |
| 2019/0265703 | A1 | 8/2019 | Hicok | |
| 2020/0019761 | A1 | 1/2020 | Kang | |
| 2020/0058092 | A1 | 2/2020 | Buttolo | |
| 2020/0387393 | A1* | 12/2020 | Xu | G06F 9/45558 |
| 2021/0039664 | A1* | 2/2021 | Nakamura | G06N 20/00 |
| 2021/0181739 | A1* | 6/2021 | Chen | G06F 9/5072 |
| 2021/0200448 | A1* | 7/2021 | Chen | G06F 3/0644 |
| 2021/0287142 | A1* | 9/2021 | Ceulemans | G06F 21/566 |
| 2022/0198336 | A1* | 6/2022 | Puente Pestaña | G06N 20/00 |
| 2022/0375130 | A1* | 11/2022 | Jendersie | G06T 7/55 |
| 2023/0012305 | A1* | 1/2023 | Bhargava | H04L 41/5006 |

FOREIGN PATENT DOCUMENTS

WO 20192064781 A1 10/2019

OTHER PUBLICATIONS

"Ultralytics / yolov5", GitHub, downloaded from the Internet on Mar. 26, 2021, 8 pages, <https://github.com/ultralytics/yolov5>.

(Continued)

*Primary Examiner* — Jonathan A Bui
(74) *Attorney, Agent, or Firm* — Nicholas A. Welling

(57) ABSTRACT

A system for optimizing deployment of a machine learning workload is provided. A computer device receives information pertaining to a machine learning workload to be processed for a client device. The computer device determines a machine learning model for the workload and a processing location for the workload based, at least in part, on the information. The computer device generates a request to process the workload at the determined processing location utilizing the determined machine learning model.

18 Claims, 9 Drawing Sheets

(56) References Cited

OTHER PUBLICATIONS

Allu et al., "Accessible Personal Transportation for People with Disabilities Using Autonomous Vehicles", Purdue e-Pubs, (2017), Undergraduate Coursework, Paper 1, <https://docs.lib.purdue.edu/ugcw/1>.

Bochkovskiy et al., "YOLOv4: Optimal Speed and Accuracy of Object Detection", arXiv:2004.10934v1 [cs.CV] Apr. 23, 2020, 17 pages.

Debaque et al., "A Modular Architecture for Optimal Video Analytics Deployment", 14th International Conference on Information Fusion Chicago, Illinois, USA, Jul. 5-8, 2011, pp. 672-678.

Deng et al., "Optimal Workload Allocation in Fog-Cloud Computing Toward Balanced Delay and Power Consumption", Article in IEEE Internet of Things Journal, Jan. 2016, DOI: 10.1109/JIOT.2016.2565516, 12 pages.

Dubal et al., "Deployment of Customized Deep Learning based Video Analytics on Surveillance Cameras", arXiv:1805.10604v2 [cs.CV] Jun. 27, 2018, 16 pages.

Eitel, Andreas, "Deep 3D Perception of People and Their Mobility Aids", Autonomous Intelligent Systems, University of Freiburg, downloaded from the Internet on Mar. 26, 2021, 5 pages (http://mobility-aids.informatik.uni-freiburg.de/>.

Lee et al., The Optimal Configuration and Workload Allocation Problem in Flexible Manufacturing Systems, International Journal of Flexible Manufacturing Systems, 3 (1991), pp. 213-230, DOI: 10.1007/BF00170207 Source: OAI.

Liu et al., "SSD: Single Shot MultiBox Detector", arXiv:1512.02325v5 [cs.CV] Dec. 29, 2016, 17 pages.

Mell et al., "The NIST Definition of Cloud Computing", Recommendations of the National Institute of Standards and Technology, Special Publication 800-145, Sep. 2011, 7 pages.

Paterna et al., Variability-Tolerant Workload Allocation for MPSoC Energy Minimization Under Real-Time Constraints, ACM Transactions on Embedded Computing Systems, vol. 11, No. 4, Article 71, Publication date: Dec. 2012, 24 pages, DOI 10.1145/2362336.2362338.

Redmon et al., "YOLOv3: An Incremental Improvement", arXiv:1804.02767v1 [cs.CV] Apr. 8, 2018, 6 pages.

Ren et al., "Faster R-CNN: Towards Real-Time Object Detection with Region Proposal Networks", IEEE Transactions on Pattern Analysis and Machine Intelligence, vol. 39, No. 6, Jun. 2017, Digital Object Identifier No. 10.1109/TPAMI.2016.2577031, 13 pages.

Ruggiero et al., "A Cooperative, Accurate Solving Framework for Optimal Allocation, Scheduling and Frequency Selection on Energy-Efficient MPSoCs", IEEE International Symposium on System-on-Chip, © 2006 IEEE, pp. 183-186.

Tong et al., "A Hierarchical Edge Cloud Architecture for Mobile Computing", IEEE INFOCOM 2016—The 35th Annual IEEE International Conference on Computer Communications, 9 pages.

Yu et al., "Distributed Optimal On-line Task Allocation Algorithm for Wireless Sensor Networks", IEEE Sensors Journal, vol. 18, No. 1, Jan. 1, 2018, pp. 446-458.

Zafari et al., "Optimal Energy Consumption for Communication, Computation, Caching, and Quality Guarantee", IEEE CSS, IEEE Transactions on Control of Network Systems, vol. 7, No. 1, Mar. 2020, pp. 151-162.

\* cited by examiner

| Model/Device | Power consumed | Prediction time | Memory required | Binary variable |
|---|---|---|---|---|
| Pre-processing, edge | $p_{e,pr}$ | $t_{e,pr}$ | $r_{e,pr}$ | $z = 0$ |
| Pre-processing, server | $p_{c,pr}$ | $t_{c,pr}$ | $r_{c,pr}$ | $z = 1$ |
| Model, edge | $p_{e,m}$ | $t_{e,m}$ | $r_{e,m}$ | $y = 0$ |
| Model, server | $p_{c,m}$ | $t_{c,m}$ | $r_{c,m}$ | $y = 1$ |

FIG. 4

500A $$t = yz\left(t_{c,pr} + t_{c,m} + t_{trans}(s)\right) + y\bar{z}\left(t_{e,pr} + t_{c,m} + \gamma t_{trans}(s)\right) + \bar{y}\left(t_{e,pr} + t_{e,m}\right)$$

$$t \leq t_{max}$$

500B $$p = yz\left(p_{c,pr} + p_{c,m} + p_{trans}(s)\right) \\ + y\bar{z}\left(p_{e,pr} + p_{c,m} + \gamma p_{trans}(s) + p_{store}(s)\right) + \bar{y}\left(p_{e,pr} + p_{e,m} + p_{store}(s)\right)$$

500C $$mem \leq mem_{max},$$

$$mem = \bar{y}\left(m_{image}(s) + r_{e,pr} + r_{e,m}\right) + y\bar{z}\left(m_{image}(s) + r_{e,pr}\right) + \bar{y}\bar{z}(0)$$

500D $$f(acc) = \alpha * \left(1 - e^{-\beta \cdot acc}\right)$$

500E $$\max_{y,m,s} \left(f(acc) - p\right)$$

$$st\ mem \leq mem_{max},\ t \leq t_{max}$$

FIG. 5

| Row | Model | Faster RCNN [15] | SSD [12] | TinyYOLO v3 [13] | YOLO v3 [13] | TinyYOLO v4 [14] | YOLO v4 [14] | YOLO v5s [11] | YOLO v5m [11] |
|---|---|---|---|---|---|---|---|---|---|
| 0 | Image size | 600 (*1000) | 512 | 540 | 540 | 540 | 540 | 540 | 540 |
| 1 | mAP | 85.20 | 82.80 | 69.60 | 82.40 | 83.10 | 83.30 | 80.60 | 81.50 |
| 2 | Inference time (ms) (Client) (cl = False) | 1000 | 400 | 65 | 300 | 60 | 225 | 210 | 300 |
| 3 | Memory (MB) (Client) (cl = False) | 2235 | 1434 | 286 | 1311 | 208 | 1429 | 156 | 453 |
| 4 | Peak Power (W) (Client) (cl = False) | 7.1 | 2.4 | 0.6 | 2.2 | 0.5 | 2.1 | 0.5 | 1.4 |
| 5 | Image size (MB) | 720 | 188 | 208 | 208 | 208 | 208 | 208 | 208 |
| 6 | Inference time (ms) (Server) | 316 | 123 | 16 | 112 | 16 | 104 | 82 | 127 |
| 7 | Total time (ms) (Server) (cl = True) | 1036 | 311 | 224 | 320 | 224 | 312 | 390 | 435 |
| 8 | f(acc) | 4.31 | 4.20 | 3.68 | 4.19 | 4.22 | 4.23 | 4.11 | 4.15 |
| 9 | *Optimization function (cl =False)* | -2.78 | 1.80 | 3.08 | 1.99 | 3.72 | 2.13 | 3.61 | 2.75 |

OPTIMIZING DEPLOYMENT OF MACHINE LEARNING WORKLOADS

BACKGROUND OF THE INVENTION

The present invention relates generally to the field of machine learning, and more particularly to optimizing the deployment of machine learning workloads between client devices and a cloud environment.

Generally, the field of cloud computing provides on-demand access, via the internet, to computing resources hosted by a remote data center. A cloud services provider (CSP) provides variations of models that include: software-as-a-service, infrastructure-as-a-service, and platform-as-a-service.

SUMMARY

Various embodiments of the present invention provide a method, system, and program product that perform the following operations (not necessarily in the following order): (i) receiving information pertaining to a machine learning workload to be processed for a client device; (ii) determining a machine learning model for the workload and a processing location for the workload based, at least in part, on the information; and (iii) generating a request to process the workload at the determined processing location utilizing the determined machine learning model.

BRIEF DESCRIPTION OF THE SEVERAL VIEWS OF THE DRAWINGS

FIG. 4 is a table depicting parameters related to a model and preprocessing, in accordance with an exemplary embodiment of the present invention.

FIG. 5 depicts equations for determining certain variables leveraged by the machine learning model within the computing environment depicted in FIG. 1, in accordance with an exemplary embodiment of the present invention.

DETAILED DESCRIPTION

Figure 1:
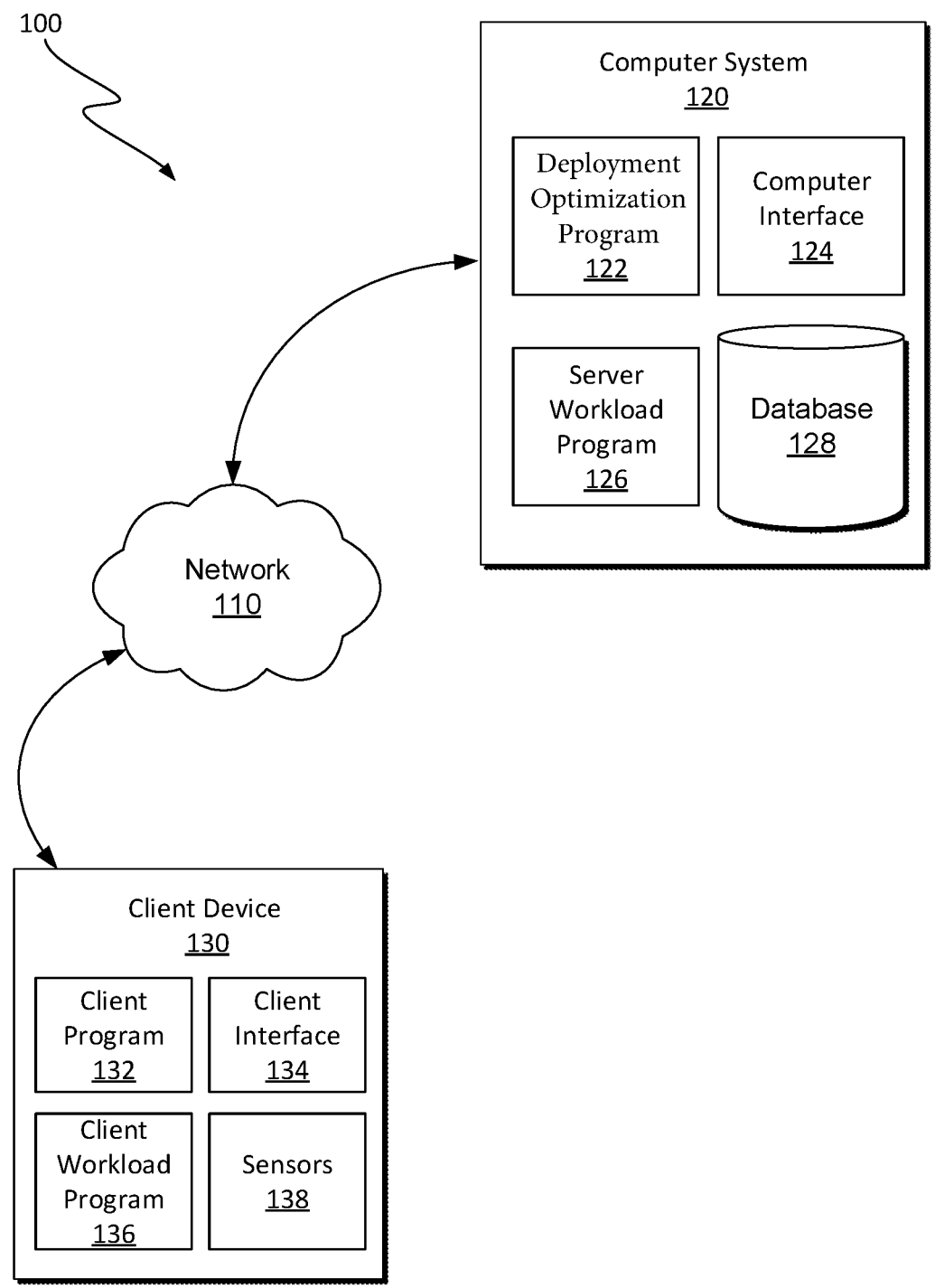
FIG. 1 is a functional block diagram illustrating a computing environment in which a system optimizes deployment of a machine learning model, in accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Various embodiments of the present invention optimize deployment of a workload (e.g., data processing) across cloud servers (i.e., server side) and one or more client devices (i.e., client side) such as autonomous vehicles. In various cases, such as when processing results are quickly needed for vehicle operation, an optimal workload is deployed on the client side. In other cases, such as when processing is resource intensive but not as time sensitive, or when processing can benefit multiple vehicles, an optimal workload is deployed on the server side.

Various embodiments of the present invention provide for optimizing the deployment of a workload across server side and client side environments. Generally speaking, a workload is data to be processed, typically by a machine learning model, to perform a vehicle operation (e.g., object detection, machine vision, acceleration, etc.). In various embodiments, optimizing the deployment of the workload includes utilizing a trained neural network to determine whether to deploy the workload on the server side, the client side, or a combination of server side and client side. Additionally, the size and type of the neural network used for workload processing is also optimized based on deployment parameters. For example, in various embodiments, if a limited number of autonomous vehicles are traveling on the roadways, then the workload can be deployed on the server side; alternatively, the workload can be deployed on the client side to prevent a bottleneck of data processing if a greater number of autonomous vehicles are traveling on the roadways.

The present invention will now be described in detail with reference to the Figures.

FIG. 1 is a functional block diagram illustrating a computing environment, generally designated 100, in accordance with an embodiment of the present invention. Computing environment 100 includes computer system 120 and client device 130. Computer system 120 includes deployment optimization program 122, computer interface 124, server workload program 126, and database 128. Client device 130 includes client program 132, client interface 134, client workload program 136 and sensors 138.

Computer system 120 may include one or more computing devices, servers, server-cluster, web servers, database and storage devices. Computer system 120 operates to communicate with client device 130 and other various client devices (not shown) over a network, such as network 110. For example, computer system 120 communicates with client program 132 to transfer data between database 128 and various other databases (not shown) that are connected to network 110. In general, computer system 120 can be any computing device or combination of devices that are communicatively connected to a network comprised of various computing devices including, but not limited to, client device 130, to provide the functionality described herein. Computer system 120 can include internal and external hardware components as described with respect to FIG. 9. Various embodiments of the present invention recognize that the system depicted in FIG. 1 may include any number of computing devices, servers, databases and/or storage devices, and the present invention is not limited to only what is depicted in FIG. 1. As such, in some embodiments, some or all of the features and functions of computer system 120 are included as part of client device 130 and/or another computing device. Similarly, in some embodiments, some of the features and functions of client device 130 are included as part of computer system 120 and/or another computing device.

Additionally, in some embodiments, computer system 120 represents a cloud computing platform. Cloud computing is a model or service delivery for enabling convenient, on demand network access to a shared pool of configurable computing resources (e.g., networks, network bandwidth, servers, processing, memory, storage, applications, virtual machines, and services) that can be rapidly provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model, and a software as a service (SaaS) model; and can be implemented as various deployment models including as a private cloud, a community cloud, a public cloud, and a hybrid cloud.

In various embodiments, computer system 120 represents an autonomous vehicle network server. In the embodiment depicted in FIG. 1, deployment optimization program 122, computer interface 124, and server workload program 126 are respectively stored on and executed by computer system 120. In other embodiments, database 128 can store and/or execute a different count of applications without departing from the scope of the present invention. In general, deployment optimization program 122 executing on computer system 120 receives respective deployment parameters and optimization target data from server workload program 126 and client workload program 136, as described herein. Additionally, deployment optimization program 122 operates to notify, via network 110, client device 130 and various other computing devices (not shown) of conditions and/or respective allocation of workloads that may occur within computer system 120. In one example, deployment optimization program 122 takes the form of a machine learning application that utilizes elements of computer system 120 to analyze deployment parameters and optimization target data transmitted from server workload program 126 and client workload program 136 regarding the deployment of workloads for data processing between the client side and server side. This example will be referenced in the discussion of various embodiments herein to illustrate various aspects of the present invention, but the present invention is not to be construed as being limited to such embodiments. In some embodiments, IoT applications executing on computer system 120 can also include analytics logic to analyze data from one or more client devices (e.g., client device 130) to facilitate optimization of device configuration rules to deploy the workload configurations, as described herein.

Computer system 120 is depicted in FIG. 1 for illustrative simplicity. However, it is to be understood that, in various embodiments, computer system 120 can include any number of databases that are managed in accordance with the functionality of deployment optimization program 122. In general, database 128 represents data and computer interface 124 manages the ability to view the data. In other embodiments, deployment optimization program 122 represents code that provides an ability to take specific action with respect to another physical or virtual resource and deployment optimization program 122 manages the ability to use and modify the data. Client program 132 can also represent any combination of the aforementioned features, in which deployment optimization program 122 has access to data stored on database 128. To illustrate various aspects of the present invention, examples of deployment optimization program 122 are presented in which deployment optimization program 122 represents one or more of a local IoT network and a machine learning model to optimize the deployment of workloads for data processing.

In this exemplary embodiment, deployment optimization program 122, computer interface 124, and server workload program 126 are stored on computer system 120. However, in other embodiments, deployment optimization program 122, computer interface 124, and server workload program 126 may be stored externally and accessed through a communication network, such as network 110. Network 110 can be, for example, a local area network (LAN), a wide area network (WAN) such as the Internet, or a combination of the two, and may include wired, wireless or any other connection known in the art. In general, network 110 can be any combination of connections and protocols that will support communications between computer system 120 and client device 130, in accordance with a desired embodiment of the present invention.

Deployment optimization program 122 is depicted in FIG. 1 for illustrative simplicity. In various embodiments of the present invention, deployment optimization program 122 represents logical operations executing on computer system 120, where computer interface 124 manages the ability to view these logical operations and their results on computer system 120. Computer system 120 can include any number of logical operations that are managed and executed in accordance with deployment optimization program 122. In some embodiments, deployment optimization program 122 represents an administrator that analyzes input and output (I/O) data. Additionally, deployment optimization program 122, when executing workload data processing configurations for autonomous vehicles, operates to monitor the I/O data that was analyzed and determines a respective workload to be deployed on one or more of: (i) server workload program 126, (ii) client workload program 136, or (iii) a combination of server workload program 126 and client workload program 136. In some embodiments, deployment optimization program 122 determines whether a specific action is likely to take place and generates a workload optimization request and communicates a notification to client device 130 indicating that a modification or reconfiguration of the workload data processing is required for client device 130.

Computer system 120 includes computer interface 124. Computer interface 124 provides an interface between computer system 120 and client device 130. In some embodiments, computer interface 124 can be a graphical user interface (GUI), a web user interface (WUI), or an image projector and can display text, documents, web browsers, windows, user options, application interfaces, instructions for operation, images, and holography displays, and includes the information (such as graphic, text, and sound) that a program presents to a user and the control sequences the user employs to control the program. In some embodiments, computer system 120 accesses data communicated from client device 130 via a client-based application that runs on computer system 120. For example, computer system 120 may include mobile application software that provides an interface between computer system 120 and client device 130.

In various embodiments of the present invention, client device 130 represents an autonomous vehicle capable of executing machine readable program instructions and communications with computer system 120. In various embodiments, computing environment 100 includes additional various other client devices (e.g., various other autonomous vehicles) that are not shown. In another embodiment, client device 130 and the various other client devices represent a computing system utilizing clustered computers and components to act as a single pool of seamless resources with access to computer system 120 and network 110. Client device 130 may include internal and external hardware components as depicted and described in further detail with respect to FIG. 9.

Sensors 138 are depicted in FIG. 1 for illustrative simplicity. In various embodiments of the present invention, sensors 138 represent various computing devices executing on client device 130, where sensors 138 communicate data to deployment optimization program 122 and client program 132, respectively. In various embodiments, sensors 138 represent computing devices that monitor and determine data processing of electrical components executing on client device 130. Additionally, in various embodiments, sensors 138 determine the locations of various other client devices (e.g., autonomous vehicles) in order to determine the data processing speed of the collective group of autonomous vehicles (i.e., client device 130 and various other client devices). In various embodiments, sensors 138 determine the data processing speeds of the respective autonomous vehicle and generate data that is communicated to deployment optimization program 122, wherein deployment optimization program 122 determines a respective workload and generates a workload optimization request and communicates the workload optimization request to client device 130.

Various embodiments of the present invention recognize that is some cases, pre-processing of a workload may be required and/or desired. Pre-processing generally includes gathering data for a machine learning mode, such as a neural network. Some examples of pre-processing operations include, but are not limited to: (i) data cleaning, (ii) instance selection, (iii) normalization, (iv) transformation, (v) feature extraction, and (vi) selection. In general, the quality of data is a priority before running an analysis and/or training a neural network. Various embodiments of the present invention provide that data pre-processing removes irrelevant, redundant information, or noisy and unreliable data, to allow the knowledge discovery during the training phase of the neural network to be more effective.

In various embodiments, deployment optimization program 122 includes a convolutional neural network (CNN), wherein the CNN comprises I/O data, as well as multiple hidden layers of neurons (e.g., RELU layer). In various embodiments, the CNN receives inputs that include, but are not limited to, (i) deployment parameters and (ii) the optimization target data, where the inputs are arranged in the neurons in the first layer of the CNN. In various embodiments, the output of the first layer travels through one or more hidden layers, where the output data of the first layer is arranged into the input of a second layer, and so on, to create a fully connected neural network. Deployment optimization program 122 analyzes the (i) the output data of the multilayer perception neural network (MLP) and (ii) the change in the weight output. Various embodiments of the present invention recognize that the output data represents an optimal deployment of a workload. In various embodiments, deployment optimization program 122 receives as output from the CNN an optimal deployment for a workload, where the optimal deployment for the workload may represent, for example, deploying the workload on the server side if a limited number of autonomous vehicles are traveling on the roadways. Alternatively, the optimal deployment for the workload may represent deploying the workload on the client side if a greater than a threshold value of autonomous vehicles is traveling on the roadways to prevent a bottleneck of data processing.

Various embodiments of the present invention provide for deployment optimization program 122 executing as a neural network to determine the optimal deployment of a workload for data processing. In various embodiments, deployment optimization program 122 determines the optimal deployment of a workload for data processing across one or more autonomous vehicles (i.e., client device 130). In various embodiments, deployment optimization program 122 determines the optimal deployment of a workload for data processing across a cloud server (i.e., computer system 120). In various embodiments, deployment optimization program 122, executing as a neural network, receives as inputs: (i) deployment parameters include pre-processing performed on the client side, pre-processing performed on the server side, a workload on the client side, and a workload on the server side and (ii) optimization target data that includes, but is not limited to, time, data processing speeds, memory, and accuracy. In various embodiments, pre-processing on the client side and pre-processing on the server side represents filtering to remove irrelevant and redundant information and/or noisy and unreliable data from the data to be sent to the neural network. In various embodiments, the workload to be performed on the client side and/or the server side represents data processing with a set of program instructions to execute autonomous vehicle operations. Additionally, in various embodiments, deployment optimization program 122 determines whether to deploy a workload on server workload program 126 if a limited number of autonomous vehicles are traveling on the roadways, and whether to deploy a workload on client workload program 136 if greater than a threshold value of autonomous vehicles are traveling on the roadways to prevent a bottleneck of data processing.

Various embodiments of the present invention recognize that various deployment parameters and optimization target data may be utilized by deployment optimization program 122 executing as a neural network to predict an optimal deployment of a workload. Various embodiments of the present invention further recognize that with the network connection between computer system 120 and client device 130, the latency and bandwidth of the data transfer are deployment parameters to be considered by the neural network (i.e., deployment optimization program 122) when predicting an optimal deployment of a workload. In various embodiments, if there is a high (e.g., greater than a threshold value) number of images or data to be processed and/or there are a high (e.g., greater than a threshold value) number of autonomous vehicles on the roadways, then deploying the workload on client workload program 136 would be optimal. In various embodiments, if there is lower than a threshold value of images or data to be processed and/or there are a limited number of autonomous vehicles on the roadways, then deploying the workload on server workload program 126 would be optimal.

Various embodiments of the present invention provide for a neural network to predict a respective workload for data processing to be deployed across an autonomous vehicle (i.e., client device 130) and a cloud network (i.e., computer system 120). Various embodiments of the present invention further provide for the deployment workload to achieve a high accuracy and low response time within the boundaries and constraints of the deployment parameters which include, for example, (i) available hardware, (ii) available power, (iii) available bandwidth and latency, (iv) available memory, and (v) available storage. In various embodiments, deployment optimization program 122 predicts an optimal end-to-end solution based on the optimization targets. In various embodiments, deployment optimization program 122 determines a model for processing the workload based, at least in part, on the status of the ecosystem (e.g., computing network), where the optimal workload is determined across the hardware and/or software stack (e.g., on the server side or client side). Additionally, in various embodiments, the optimization targets are used in different ways—such as without a machine learning model/neural network. For example, in various embodiments, instead of being used in training a machine learning model/neural network, the deployment parameters and optimization targets are initialized as variables and deployment optimization program 122 utilizes an integer linear programming model to compute an optimization function that produces an optimal deployment of the workload that achieves a desired performance and accuracy. In other embodiments, a naïve maximization function may also be used. In these embodiments, various combinations of the workload deployments can be calculated and the workload deployment that results in the maximum output can be used.

Figure 2:
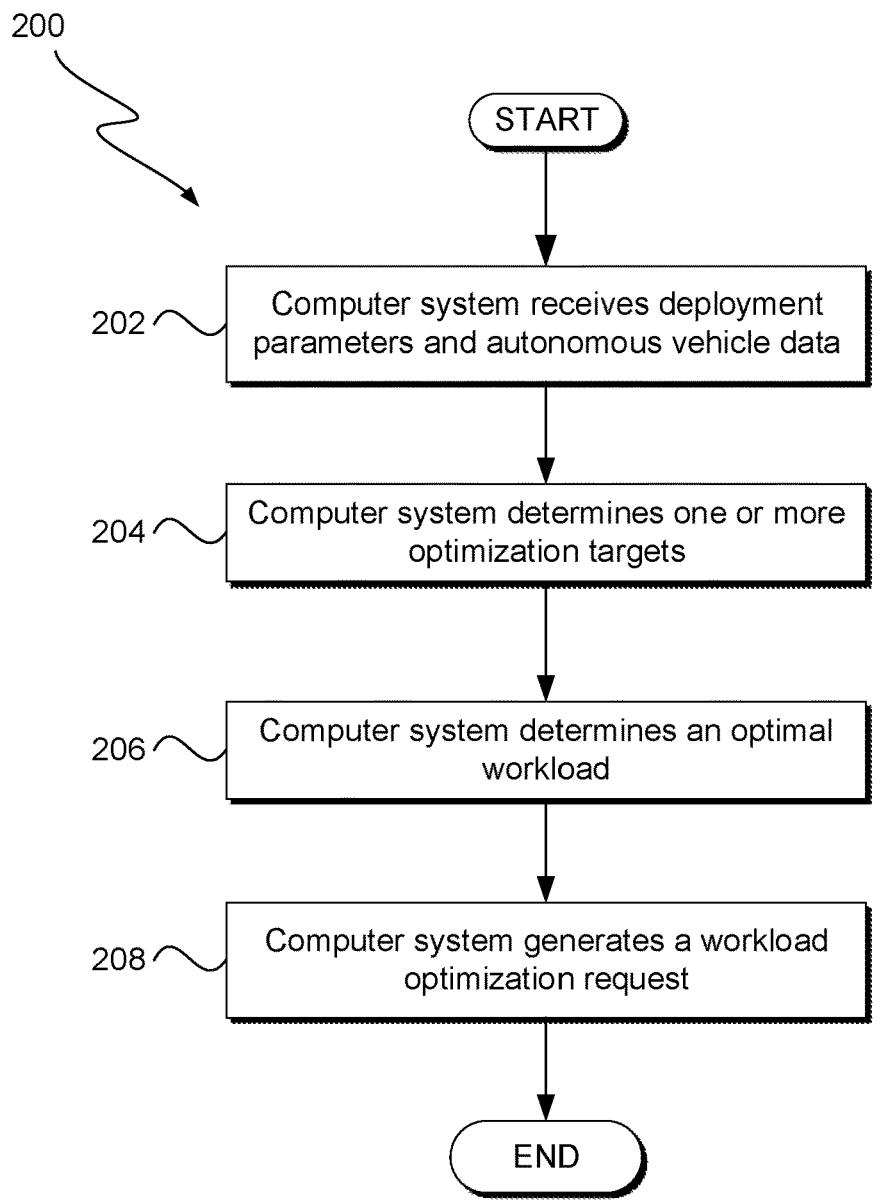
FIG. 2 is a flowchart which illustrates operational processes of executing a system to determine an optimal workload, on a computing device within the environment of FIG. 1, in accordance with an exemplary embodiment of the present invention.

FIG. 2 is a flowchart depicting operations for determining an optimal workload within computing environment 100, in accordance with an illustrative embodiment of the present invention. More specifically, FIG. 2, depicts combined overall operations 200, of deployment optimization program 122. In some embodiments, operations 200 represent logical operations of deployment optimization program 122, wherein deployment optimization program 122 represents interactions between logical computing devices communicating with computer system 120 and various other computing devices connected to network 110. It should be appreciated that FIG. 2 provides an illustration of one implementation and does not imply any limitations with regard to the environments in which different embodiments may be implemented. Many modifications to the depicted environment may be made. In one embodiment, the series of operations, in flowchart 200, can be terminated at any operation. In addition to the features previously mentioned, any operations of flowchart 200, can be resumed at any time.

In operation 202, deployment optimization program 122 receives deployment parameters and optimization target data. In various embodiments, deployment optimization program 122 includes a neural network that executes on computer system 120 (i.e., a cloud computing network). In various embodiments, deployment optimization program 122 identifies deployment parameters (i.e., deployment variables) for a workload to be deployed for data processing. In various embodiments, parameter y represents where to deploy the workload (e.g., on client side, server side, or a combination of client side and server side). Additionally, in various embodiments, y denotes a binary variable, which is true if the inference is done on the cloud network (i.e., computer system 120), and false if it is done on the client device (i.e., client device 130). In various embodiments, processing a workload on client device 130 allows for the elimination of transmission delay between computer system 120 and client device 130. Various embodiments of the present invention recognize that processing a workload on client device 130 requires additional battery and memory consumption on client device 130, which operates on a limited availability of battery and memory compared to the cloud network (i.e., computer system 120). In various embodiments, z denotes a binary variable, which is true if pre-processing of data (e.g., an image for object detection) is performed on the cloud network (i.e., computer system 120). In various embodiments, m represents a light model which relates to lower accuracy, however, m has lower requirements for memory usage, battery use, and interference time. In various embodiments, s represents the size of data, where having a larger data file corresponds to higher accuracy because a larger data file carries a greater amount of information; however, s has a greater requirement for inference time and memory. In various embodiments, deployment optimization program 122 identifies the values of the variables, as discussed above, and further identifies the deployment parameters that include, but are not limited to, (i) resources required for the workload to process on client device 130 and for pre-processing for the rest of the workload and (ii) resources required by the workload to process on computer system 120 (i.e., cloud network) and for pre-processing for the rest of the workload. In various embodiments, the defining of the various parameters and variables is depicted in FIG. 4, which will be discussed in further detail below. In various embodiments, deployment optimization program 122 receives optimization target data that includes, is but not limited to, (i) memory capacity, (ii) data processing speed, (iii) battery levels, and (iv) vehicle operation to be performed (e.g., object detection, acceleration, etc.).

Various embodiments of the present invention provide that, in some cases, to estimate the deployment parameters depicted in FIG. 4, the workloads execute on each client device (i.e., client device 130) and client program 132 monitors the data obtained from the workloads executing and communicates the performance and resources utilized to deployment optimization program 122. In various embodiments, this estimation of deployment parameters is highly accurate, however, this estimation requires one or more executions of the workloads and the availability to test each individual client device one or more times. Alternatively, various embodiments of the present invention provide that if each individual client device is not available to be tested one or more times utilizing the workloads reported results from standardized datasets, then deployment optimization program 122 utilizes floating points operations per second (FLOPS), the bandwidth and power of the client devices to scale the parameters of the dataset and retest the client devices. However, scaling the parameters results in a potentially inaccurate model, because the model's performance rarely scales linearly with respect to the client device's data. Various embodiments of the present invention monitor the workloads executed on each client device and determine the performance of resources utilized to deployment optimization program 122.

In operation 204, deployment optimization program 122 determines one or more optimization targets. In various embodiments of the present invention, the one or more optimization targets (e.g., workload execution time on the client side and server side, available energy budget on the client side and server side, total memory of the client side and server side, hardware resources of the client side and server side, and desired accuracy of the workload, also referred to as time, power, memory, and accuracy) represent values to be determined (e.g., optimization target data). In various embodiments, deployment optimization program 122 determines the optimization targets, which include: (i) minimizing the total prediction t, (ii) minimizing total power drawn from client device 130 p, (iii) ensuring that total memory usage mem on device does not exceed the maximum free device memory, $mem_{max}$, and (iv) maximizing the model accuracy acc. Various embodiments of the present invention provide that some examples of equations utilized by deployment optimization program 122 to solve for the above-mentioned optimization targets are depicted in FIG. 5, which will be discussed in the immediately following paragraphs, as well as in additional detail further below.

Various embodiments of the present invention provide that deployment optimization program 122 determines the values of the optimization targets. Equation 500A (see FIG. 5) represents the total sum of the transmission times for data to be processed between computer system 120 and client device 130. In various embodiments, deployment optimization program 122 determines the value of total time t, as depicted in equation 500A. Various embodiments of the present invention recognize that reducing prediction time beyond a threshold value, $t_{max}$, does not yield any beneficial value to the optimization of workload processing. In one example embodiment, the dataset represents the streaming video from a camera where there are no benefits to having a processing speed faster than the frame rate of the streaming video; therefore, the constraint is recognized as: $t \le t_{max}$. Equation 500B (see FIG. 5) represents the total sum of the power consumed for data to be processed between computer system 120 and client device 130. In various embodiments, deployment optimization program 122 determines the value of total power p, as depicted in equation 500B. Various embodiments of the present invention provide that power consumed by the memory optimization target is negligible in comparison to power consumed through the use of graphical processing units (GPUs) and central processing units (CPUs) through the execution of a neural network model. Additionally, the constraint of the memory optimization target is represented as: $mem \le mem_{max}$. Equation 500C (see FIG. 5) represents the total sum of memory for data to be processed between computer system 120 and client device 130.

In various embodiments, deployment optimization program 122 determines the accuracy of the overall optimization target for the above specified optimization targets as depicted in equation 500D (see FIG. 5). Various embodiments of the present invention provide that the accuracy function to determine the overall optimization target is a non-linear function. Various embodiments of the present invention further present that the weight applied to increase the accuracy of the overall optimization target should be greater when a lower accuracy is presented as compared against a higher presented accuracy. In one example embodiment, increasing the accuracy of the overall optimization target from 80% to 90% should receive a lesser weight than increasing the accuracy from 30% to 40%.

In various embodiments, deployment optimization program 122 determines an optimization function by solving equation 500E (see FIG. 5), where the determination of the optimization targets in equations 500A, 500B, 500C, and 500D (hereinafter equations 500A-500D) are utilized in the formulation of equation 500E. Various embodiments of the present invention provide that α, used in calculating f(acc), specifies the accuracy-power tradeoff. Various embodiments of the present invention further provide that the value of α varies dependent upon the accuracy requirement for the specific workload in use (e.g., (i) client side, (ii) server side, or (iii) a combination of client side and server side).

In operation 206, deployment optimization program 122 determines an optimal workload, based on the deployment parameters and the optimization target data, using a neural network. In various embodiments, deployment optimization program 122 utilizes the deployment parameters and optimization target data relating to the workload to be performed, and places this data into neurons of the first layer of the machine learning model where deployment optimization program 122, executing as a machine learning model, passes the neurons through multiple hidden layers to an output layer of the machine learning model. In various embodiments, deployment optimization program 122 produces an optimal deployment for the workload to process data based, at least in part, on the deployment parameters, and optimization target data that are calculated from equations 500A-500E. In various embodiments, deployment optimization program 122 predicts that the optimal deployment for the workload to process data should be on the client side (e.g., client workload program 136). In various embodiments, deployment optimization program 122 predicts that the optimal deployment for the workload to process data should be on the server side (e.g., server workload program 126). In various embodiments, deployment optimization program 122 predicts that the optimal deployment for the workload to process the data should be deployed on a combination of the server side and the client side, examples of which will be discussed in further detail below.

In operation 208, deployment optimization program 122 generates a workload optimization request. In various embodiments, deployment optimization program 122 generates the workload optimization request based, at least in part, on the prediction of the optimal deployment of the workload to process data. In various embodiments, deployment optimization program 122 generates a workload optimization request based, at least in part, on the optimal deployment of the workload to be deployed on the client side. In various embodiments, deployment optimization program 122 generates program instructions instructing client workload program 136 to deploy the optimal workload to process data that relates to operational functions, such as: (i) image processing, (ii) radar positioning of various other vehicles (e.g., autonomous vehicles and/or non-autonomous vehicles), (iii) lidar sensors measuring distances of pulses of light, (iv) spatial detection of roadway and lane boundaries, (v) motion and object detection sensors assisting is automated parking, and (vi) navigational operations that include, but are not limited to operations that utilize a compass and geographical maps. In various embodiments, deployment optimization program 122 communicates the workload optimization request to client workload program 136 with program instructions instructing client workload program 136 to deploy the workload for data processing and execute the operations to complete the required data processing.

In various embodiments, deployment optimization program 122 generates a workload optimization request based, at least in part, on the optimal deployment of the workload to be deployed on the server side. In various embodiments, deployment optimization program 122 communicates a set of program instructions to server workload program 126 to deploy the workload for data processing on computer system 120 that relates to operational functions including: (i) image processing, (ii) radar positioning of various other vehicles (e.g., autonomous vehicles and/or non-autonomous vehicles), (iii) lidar sensors measuring distances of pulses of light, (iv) spatial detection of roadway and lane boundaries, (v) motion and object detection sensors assisting is automated parking, and (vi) navigational operations that include, but are not limited to, operations utilizing a compass and geographical maps. In various embodiments, deployment optimization program 122 communicates program instructions to client program 132 instructing client program 132 that server workload program 126 will execute the workload for data and communicate required data to client program 132 to execute the functions to operate client device 130 (i.e., an autonomous vehicle). Additionally, in various embodiments, deployment optimization program 122 communicates a set of program instructions to client program 132 instructing client program 132 to communicate all data relating to the operational functions of client device 130.

In various embodiments, deployment optimization program 122 generates a workload optimization request based, at least in part, on the optimal deployment of the workload to be deployed on a combination of server side and client side. In various embodiments, deployment optimization program 122 executes program instructions to deploy the workload for data processing on computer system 120 and client program 132 that relates to operational functions. In various embodiments, deployment optimization program 122 further determines that the workloads have a higher plausibility of executing more effectively where the workloads associated with the operational functions are delegated between the combination of the server side and the client side. In one example embodiment, deployment optimization program 122 determines that it is more effective to deploy workloads on the server side and communicates a set of program instructions to server workload program 126 to execute the program instructions to deploy the workloads that include, but are not limited to, (i) determining radar position of various other vehicles (e.g., autonomous vehicles and/or non-autonomous vehicles), (ii) navigational operations, and (iii) image processing. Additionally, in this example embodiment, deployment optimization program 122 determines that it is more effective to deploy workloads on the client device and communicates a set of program instructions to client workload program 136 to execute the program instructions to deploy the workloads that include, but are not limited to, (i) lidar sensors measuring distances of pulses of light, (ii) detection of road and lane boundaries, and (iii) sensors assisting in automated parking. In various embodiments, deployment optimization program 122 identifies a first subset of the workload for data processing for operational functions that are to be deployed on the server side (i.e., server workload program 126) and a second subset of the workload for data processing for operational functions that are to be deployed on the client side (i.e., client workload program 136). In various embodiments, server workload program 126 executes the workload for data processing for the first subset of operational functions and communicates the data to client program 132 with program instructions to execute the operational functions relating to the first subset on client device 130 (i.e., autonomous vehicle). In various embodiments, deployment optimization program 122 communicates program instructions to client program 132 instructing client workload program 136 to deploy the workload for data processing for the second subset of operational functions. Additionally, in various embodiments, deployment optimization program 122 communicates program instructions to client workload program 136 instructing client workload program 136 to execute the second subset of operational functions of client device 130.

Figure 3:
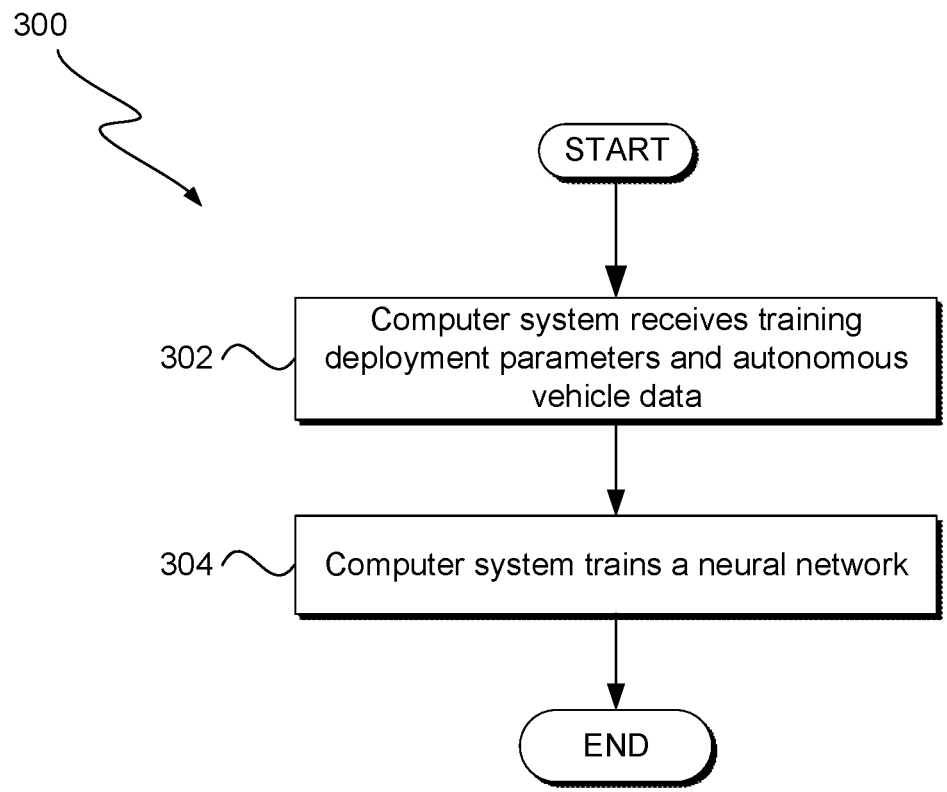
FIG. 3 is a flowchart which illustrates operational processes of executing a system for training a machine learning model for an autonomous vehicle, on a computing device within the environment of FIG. 1, in accordance with an exemplary embodiment of the present invention.

FIG. 3 depicts flowchart, 300, depicting operations of deployment optimization program 122 in computing environment 100, in accordance with an illustrative embodiment of the present invention. More specifically, FIG. 3 depicts combined overall operations, 300, of deployment optimization program 122 executing on computer system 120. In some embodiments, operations 300 represents logical operations of deployment optimization program 122, wherein interactions between deployment optimization program 122, client program 132, and sensors 138 represent logical units executing on computer system 120. It should be appreciated that FIG. 3 provides an illustration of one implementation and does not imply any limitations with regard to the environments in which different embodiments may be implemented. Many modifications to the depicted environment may be made. In one embodiment, the series of operations, of flowchart 300, can be performed simultaneously. Additionally, the series of operations, in flowchart 300 can be terminated at any operation. In addition to the features previously mentioned, any operations of flowchart 300 can be resumed at any time.

In operation 302, deployment optimization program 122 receives training deployment parameters and training optimization target data. In various embodiments, deployment optimization program 122 receives as training data: (i) deployment parameters that include pre-processing on the client side, pre-processing on the server side, the workload on client side, and the workload on server side and (ii) optimization target data that includes workload execution time on the client side and server side, available energy budget on the client side and server side, total memory of the client side and server side, hardware resources of the client side and server side, and desired accuracy of the workload. Various embodiments of the present invention provide that any combination of deployment parameters and optimization target data may exist within the training data to incorporate a broad spectrum of variants that could occur between the deployment parameters and optimization target data to predict an optimal workload for data processing to be deployed.

In operation 304, deployment optimization program 122 trains a neural network. In various embodiments, the training data that is based, at least in part, on (i) deployment parameters, (ii) optimization target data, and (iii) an optimal deployment workload associated with the deployment parameters and the optimization target data (based on either user input/labelling or on a separate optimization function). Various embodiments of the present invention provide that the training data is required to train the neural network to learn and predict an optimal workload for subsequent predictions. In one example embodiment, deployment optimization program 122 receives values for the optimization target data that includes, but not limited to: (i) a workload execution time on the client side and server side where the prediction time value is less than or equal to a threshold maximum value for prediction time, (ii) power capabilities of the hardware resources of the client side and server side, (iii) total memory of the client side and server side, where the total memory value is equal to or less than the maximum capability of the GPUs and CPUs, and a percentage value of the desired accuracy of the workload; and deployment optimization program 122 receives deployment parameters that include, but are not limited to: (i) workload being deployed on the client side (e.g., $p_{e,m}$, $t_{e,m}$, $r_{e,m}$, y=0), (ii) workload being deployed on the server side (e.g., $p_{c,m}$, $t_{c,m}$, $r_{e,m}$, y=1), (iii) pre-processing data on the client side (e.g., $p_{e,pr}$, $t_{e,pr}$, $r_{e,pr}$, z=0), and (iv) pre-processing data on the server side (e.g., $p_{c,pr}$, $t_{c,pr}$, $r_{c,pr}$, z=1). In this example embodiment, deployment optimization program 122 utilizes the deployment parameters and the optimization targets, as discussed above, to determine an optimal workload to be deployed on either the client side or the server side.

In a first example embodiment, deployment optimization program 122 is trained using inputs that include deployment parameters, optimization target data, and an optimal workload to be deployed to complete three subtasks (e.g., vehicle operations). The vehicle operations to be completed by the workload include object detection, object recognition, and navigational operations. The optimization target data includes, but is not limited to, time and memory. The maximum threshold value for the workload execution time is three (3) seconds and the client side can perform an execution time of one (1) second, the server side can perform an execution time of one-half (0.5) second, and total transmission time between the server side and client side is one (1) second. The total memory cannot exceed the maximum capabilities of the GPUs and CPUs operating on the client side and the server side. The total free memory on the client side is equal to or less than 1.15 megabytes (MB), and the total free memory on the server side is equal to or less than 2.9 terabytes (TB). The deployment parameters include (i) workload being deployed on the client side (e.g., $p_{e,m}$, $t_{e,m}$, $r_{e,m}$, y=0), (ii) workload being deployed on the server side (e.g., $p_{c,m}$, $t_{c,m}$, $r_{c,m}$, y=1), (iii) pre-processing data on the client side (e.g., $p_{e,pr}$, $t_{e,pr}$, $r_{e,pr}$, z=0), and (iv) pre-processing data on the server side (e.g., $p_{c,pr}$, $t_{c,pr}$, $r_{c,pr}$, Z=1). The optimal workload to be deployed to complete the three vehicle operations includes: (i) deploying the object detection vehicle operation workload on the client side, because the transmission time of the data being communicated to the server side to detect the object and communicate back to the client side to execute the vehicle operation would take too long; (ii) deploying the object recognition vehicle operation workload on the server side, because the total amount of free memory required to complete the object recognition vehicle operation and the object detection vehicle operation on the client side exceeds the 1.15 MB of free memory on the client side; and (iii) deploying the navigational vehicle operations workload on the server side, because the total free memory to complete the navigational vehicle operation exceeds the total free memory (e.g., 1.15 MB) on the client side. In this example embodiment, deployment optimization program 122 determines the respective optimal deployment for each respective vehicle operation (e.g., object detection, object recognition, and navigational operations) across either the client side or the server side. In this example embodiment, deployment optimization program 122 determines that the optimal deployment to complete object detection is to deploy the workload on the client side; deployment optimization program 122 determines that the optimal workload to complete object recognition is to deploy the workload on the server side; and deployment optimization program 122 determines that the optimal workload to complete navigational operations is to deploy the workload on the server side. Various embodiments of the present invention provide that any combination of values of the optimization target data that includes time, power, memory, and accuracy and any combination of deployment parameters, as discussed above, can be provided as inputs to the neural network (e.g., deployment optimization program 122) to determine the optimal deployment of the workload (e.g., data processing) to complete a vehicle operation on either the server side, client side, or a combination of server side and client side.

In at least a second example embodiment, deployment optimization program 122 is a trained neural network. In this second example embodiment, deployment optimization program 122 determines the optimal workload to be deployed for three vehicle operations (e.g., object detection, object recognition, and navigational operations). At a first time (e.g., T=0), deployment optimization program 122 receives inputs that include deployment parameters and optimization target data. At, T=0 deployment optimization program 122 receives deployment parameters that include: (i) workload being deployed on the client side (e.g., $p_{e,m}$, $t_{e,m}$, $r_{e,m}$, y=0), (ii) workload being deployed on the server side (e.g., $p_{c,m}$, $t_{c,m}$, $r_{e,m}$, y=1), (iii) pre-processing data on the client side (e.g., $p_{e,pr}$, $t_{e,pr}$, $r_{e,pr}$, z=0), and (iv) pre-processing data on the server side (e.g., $p_{c,pr}$, $t_{c,pr}$, $r_{c,pr}$, z=1). In this example embodiment, at T=0, the optimization target data includes, but is not limited to, time and memory. The optimization target data for time and memory at T=0 include: the maximum threshold value for the workload execution time is three (3) seconds and the client side can perform an execution time of one (1) second, the server side can perform an execution time of one-half (0.5) second, and total transmission time between the server side and client side is seven-tenths (0.7) second. The total memory cannot exceed the maximum capabilities of the GPUs and CPUs operating on the client side and the server side. The total free memory on the client side is equal to or less than 2.15 megabytes (MB), and the total free memory on the server side is equal to or less than 7.6 terabytes (TB). At T=0 deployment optimization program 122 determines that the optimal workload for deployment of the three vehicle operations includes: deploying the workload for object detection vehicle operation on the server side, because the amount of total free memory and threshold low transmission time allows for object detection to be processed on the server side; deploying the workload for object recognition vehicle operation on the server side, because the amount of total free memory and threshold low transmission time allows for object recognition to be processed on the server side; and deploying the workload for navigational vehicle operations on the server side. Various embodiments of the present invention provide that the system is constantly identifying updated optimization target data and updated deployment parameters and utilizing this updated to determine, using the neural network, the optimal workload to be deployed across the server side, client side, or a combination of server side and client side.

In this second example embodiment, at a second point in time (e.g., T=1) which is later than at T=0, the optimization target data includes, but is not limited to, time and memory. The optimization target data for time and memory at T=1 include: the maximum threshold value for the workload execution time is three (3) seconds and the client side can perform an execution time of one (1) second, the server side can perform an execution time of one-half (0.5) second, and total transmission time between the server side and client side is twelve-tenths (1.2) second. The total memory cannot exceed the maximum capabilities of the GPUs and CPUs operating on the client side and the server side. The total free memory on the client side is equal to or less than 1.9 megabytes (MB), and the total free memory on the server side is equal to or less than 2.6 terabytes (TB). Deployment optimization program 122 receives optimization target data at T=1 and deployment parameters, as discussed above, as inputs to the neural network. Deployment optimization program 122 determines the optimal workload to be deployed for the three vehicle operations at T=1. At T=1 deployment optimization program 122 determines that the optimal workload for deployment of the three vehicle operations includes: deploying the workload for object detection vehicle operation on the client side, because the transmission time of the data being communicated to the server side to detect the object and communicate the set of program instructions back to the client side to execute the vehicle operation would take too long; deploying the workload for object recognition vehicle operation on the server side, because the total amount of free memory required to complete the object recognition vehicle operation and the object detection vehicle operation on the client side exceeds the 1.9 MB of free memory on the client side; and deploying the workload for navigational vehicle operations on the server side, because the total free memory to complete the navigational vehicle operation exceeds the total free memory (e.g., 1.9 MB) on the client side.

In various embodiments, the training data is provided to the neurons of an input layer within the neural network. In various embodiments, deployment optimization program 122 learns from the training data within the neurons as the signals of the neurons travel multiple hidden layers within the neural network. In various embodiments, deployment optimization program 122 learns as the training data travels through the edges of the multiple hidden layers, where the weight of the edge adjusts as deployment optimization program 122 continues to learn from the training data. In various embodiments, the weight of the edges increases or decreases the strength of the signal at the edges. In various embodiments, deployment optimization program 122 receives output data from the output layer of the neural network that is based, at least in part, on an optimal workload to be deployed on the server side, client side, or a combination of the server side and client side.

In various embodiments, the optimal workload to be deployed relates to an autonomous vehicle operation and further, the optimal workload includes, but is not limited to, different operations performed on the autonomous vehicle. In a third example embodiment, during a period of time in the early morning there is little traffic and the network itself may not be congested in comparison to a period of time during rush-hour. Additionally, electric-autonomous vehicles may have enough battery power to complete various vehicle operations. In this example embodiment, the neural network receives inputs (e.g., deployment parameters and optimization target data) that include, but are not limited to, this data (e.g., network traffic, available battery power levels, amount of vehicle operations to be completed, etc.) and the neural network determines the optimal deployment of the workload. Additionally, in this example embodiment, deployment optimization program 122 determines that object detection-related operations are optimally deployed on the autonomous vehicle and that object recognition tasks are optimally deployed on the backend server side based, at least in part, on low network utilization.

In a fourth example embodiment, during a period of time during rush-hour the network becomes congested because a high number of vehicles is driving on the roadways. In this example embodiment, the optimal workload must be updated to account for the high threshold value of vehicles and network congestion. In this example embodiment, the neural network receives inputs (e.g., deployment parameters and optimization target data) that include, but is not limited to, this data (e.g., high network traffic congestion, available battery power levels, amount of vehicle operations to be completed, etc.) and the neural network determines an optimal deployment of the workload. Additionally, in this example embodiment, deployment optimization program 122 determines that the optimal deployment of the workload for object detection and object recognition is across the autonomous vehicles based, at least in part, on high network utilization.

In various embodiments, at the completion of training the neural network in operation 304, the trained neural network can be utilized to predict one or more optimal deployment workloads, as further discussed in operation 206. In various embodiments, deployment optimization program 122 determines the optimal workload based, at least in part, on the output data and communicates the optimal workload to be deployed on server workload program 126, client workload program 136, or a combination of server workload program 126 and client workload program 136.

FIG. 4 depicts table 400. Table 400 defines parameters related to performance and costs for the deployment of a workload for data processing and pre-processing on various devices (e.g., client side and server side). In various embodiments, the deployment parameters define the resources required by the workload on the client side for pre-processing and data processing during the workload on client device 130. Additionally, in various embodiments, the deployment parameters define the resources required by the workload on the server side for pre-processing and data processing during the workload on computer system 120.

In various embodiments, for storage resources, $p_{store}(s)$ represents the power required on the client side to store an image of size s. In various embodiments, $m_{image}(s)$ represents the memory required to cache an image of size s on the client side. In various embodiments, for transmission resources, $p_{trans}(s)$, and $t_{trans}(s)$ respectively, represent the power and time required for transmission of an image of size s from the client side to the server side. Various embodiments of the present invention provide that output bounding boxes do not have a transmission cost as the output bounding boxes can be transmitted through text file. Lastly, y represents the average compression achieved by pre-processing an image of size s. Various embodiments of the present invention provide that transmission resources between client side and server side are directly proportional to the size of the image, where time taken to transmit a pre-processed image is presented as $\gamma t_{trans}(s)$.

In FIG. 5, (i) equation 500A represents, at least, optimization target time, (ii) equation 500B represents, at least, optimization target power, (iii) equation 500C represents, at least, optimization target memory, (iv) equation 500D represents, at least, optimization target accuracy, and (v) equation 500E represents at least, the optimization value. In general, the optimization targets: time, power, memory, and accuracy, are calculated, at least, in accordance with: (i) equation 500A, (ii) equation 500B, (iii) equation 500C, and (iv) equation 500D, respectively, to solve for the optimization value in equation 500E in FIG. 5.

In equation 500A, the value of total time t is determined. In equation 500A, the first term of the time equation: $yz(t_{c,pr}+t_{c,m}+t_{trans}(s))$ represents both pre-processing and workload processing executing on the cloud network, where the first term represents the sum of the transmission time between the server side and client side and time taken on the cloud network for pre-processing and workload processing, respectively. In equation 500A, the second term of the time equation: $\bar{y}\bar{z}$ ($t_{e,pr}+t_{c,m}+(s)$) represents pre-processing happening on the client side (i.e., autonomous vehicle), where a dataset is reduced by size γ being transmitted and prediction through a neural network on the server side. In equation 500A, the third term of the time equation: $\bar{y}$ ($t_{e,pr}+t_{c,m}$) represents the processing of datasets occurring on the client side. The three terms are leveraged to determine the value of total time t. In equation 500A, prediction time reduced beyond a threshold value: $t_{max}$ does not yield any beneficial value to the optimization of workload processing, therefore the constraint is recognized as: $t \leq t_{max}$.

In equation 500B, the value of total power p is determined. In equation 500B, the first term: yz ($p_{c,pr}+P_{c,m}+p_{trans}$ (s)) represents both pre-processing and workload processing happening on the server side and is the sum of power usage and power usage on the server side for pre-processing and workload prediction, respectively. In equation 500B, the second term: $y\bar{z}$ ($p_{e,pr}+p_{c,m}+\gamma p_{trans}(s)+p_{store}(s)$) represents power usage of pre-processing executing on the client side and the power usage of prediction through a neural network executing on the server side. In equation 500B, the third term: $\bar{y}$ ($p_{e,pr}+p_{e,m}+p_{store}(s)$) represents the power usage of the processing of datasets occurring on client side.

In equation 500C, the constraint of the memory optimization target is determined. In equation 500C, the first term: $\bar{y}(m_{image}$ (s)$+r_{e,pr}+r_{e,m}$) represents the memory capacity of the processing of dataset occurring on the client-device. In equation 500C, the second term: $Y\bar{z}(m_{image}(s)+r_{e,pr})$ represents the memory capacity of pre-processing executing on the client device and the memory capacity of prediction through a neural network executing on the server side. In equation 500C, the third term: $\bar{y}z(0)$ represents the memory cost of pre-processing and workload processing happening on the server side which is assumed to be able to use full memory.

In equation 500D, the accuracy of the overall optimization target is determined. Equation 500D is a non-linear function, where α,β are parameters which specify the weight of accuracy in overall optimization target.

In equation 500E, the optimization value is determined. In equation 500E, the maximum value applied for the optimization targets is calculated, where α, used in calculating f(acc), specifies the accuracy-power tradeoff.

In various embodiments, in addition to determining an optimal location to deploy a workload (e.g., client or server), deployment optimization program 122 also determines an optimal machine learning model for processing the workload. For example, in an example embodiment, eight different machine learning models are considered for deployment. In this example embodiment, the client device is an autonomous vehicle and the workload is an object detection workload. The autonomous vehicle processes workloads using an embedded, low-power computing board, while the server processes workloads using a high-powered GPU.

Transmission power to transfer an image from the autonomous vehicle to the server is negligible in comparison to executing the models, and the average transmission speed is 1.0 MBps. And for the purposes of this example embodiment, it is assumed that only one image size is used for each model, and that pre-processing and processing (e.g., model inference) happen on the same device. Further, in this embodiment, an example object detection dataset, comprising a plurality of example images with bounding boxes for annotations, is utilized.

Figure 6:
FIG. 6 is a table depicting values relating to the determination of which machine learning model to utilize for processing a workload, in accordance with an exemplary embodiment of the present invention.

Referring still to the example embodiment, FIG. 6 depicts table 600 including various values relating to the determination of which machine learning model to utilize for processing the workload. As shown in FIG. 6, the horizontal axis depicts machine learning model names for the eight machine learning models, row 0 depicts an image size, and row 1 depicts machine learning model accuracy, measured in terms of mean average precision (mAP). The computed power, memory, and inference time of each model on the client autonomous vehicle are depicted in rows 2-4, respectively. The transmission time for an image from the autonomous vehicle to the server, the inference time (e.g., processing time) on the server, and the total time on the server are depicted in rows 5-7, respectively. The computed accuracy function is then depicted in row 8, where α=5 and β=1, and the calculated optimization function for the autonomous vehicle is depicted in row 9 (where the optimization function for the server is the same as row 8, as the power of the server is assumed to be zero).

Referring still to the example embodiment depicted in FIG. 6, the memory cutoff ($mem_{max}$) is 2000 MB based on the free memory available on the autonomous vehicle. Further, the deployment parameters specify that at least four images per second should be able to be processed (250 milliseconds per image). As such, many of the models are eliminated from consideration based on their values in row 7 (for cloud) and row 2 (for client). For on-client models, only the four fastest models (TinyYOLOv3, TinyYOLOv4, YOLOv4, and YOLOv5) remain, and for server-side models, only two remain (TinyYOLOv3 and TinyYOLOv4). For these models, the optimization functions for the server (row 8) and the client (row 9) are compared, resulting in model TinyYOLOv4 being selected for execution on the server for having the highest value.

Various embodiments of the present invention provide a computer-implemented method that incudes receiving information pertaining to a machine learning workload to be processed for a client device; determining a machine learning model for the workload and a processing location for the workload based, at least in part, on the information; and generating a request to process the workload at the determined processing location utilizing the determined machine learning model.

In various embodiments, the determined processing location is the client device and in various embodiments, the determined processing location is a server. In various embodiments, determining the processing location for the workload includes selecting the server from a set of available servers.

In various embodiments, the workload includes an input image. In various embodiments, the method further includes: determining to pre-process the input image prior to processing the workload based, at least in part, on the information; and determining a pre-processing location based, at least in part, on the information. In various embodiments, the determined processing location is a server; and the determined pre-processing location is the client device. In various embodiments, the method further includes determining an output image size for the pre-processing of the input image based, at least in part on the information.

In various embodiments, the information identifies: (i) one or more processing time requirements, and (ii) available processing resources on the client device. In various embodiments, the information further identifies one or more machine learning model accuracy requirements. In various embodiments, the information further identifies: (i) that the workload is located at the client device, and (ii) a transmission speed for transmitting the workload between the client device and a server.

In various embodiments, determining the machine learning model for the workload and the processing location for the workload includes computing an optimization function utilizing an integer linear programming method.

In various embodiments, the client device is an autonomous vehicle, and the workload is selected from the group consisting of: (i) an object detection workload; (ii) an object recognition workload; (iii) a radar positioning workload; (iv) a lidar (light detection and ranging) workload; (v) a spatial detection workload; (vi) an automated parking workload; and (vii) a navigational workload.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
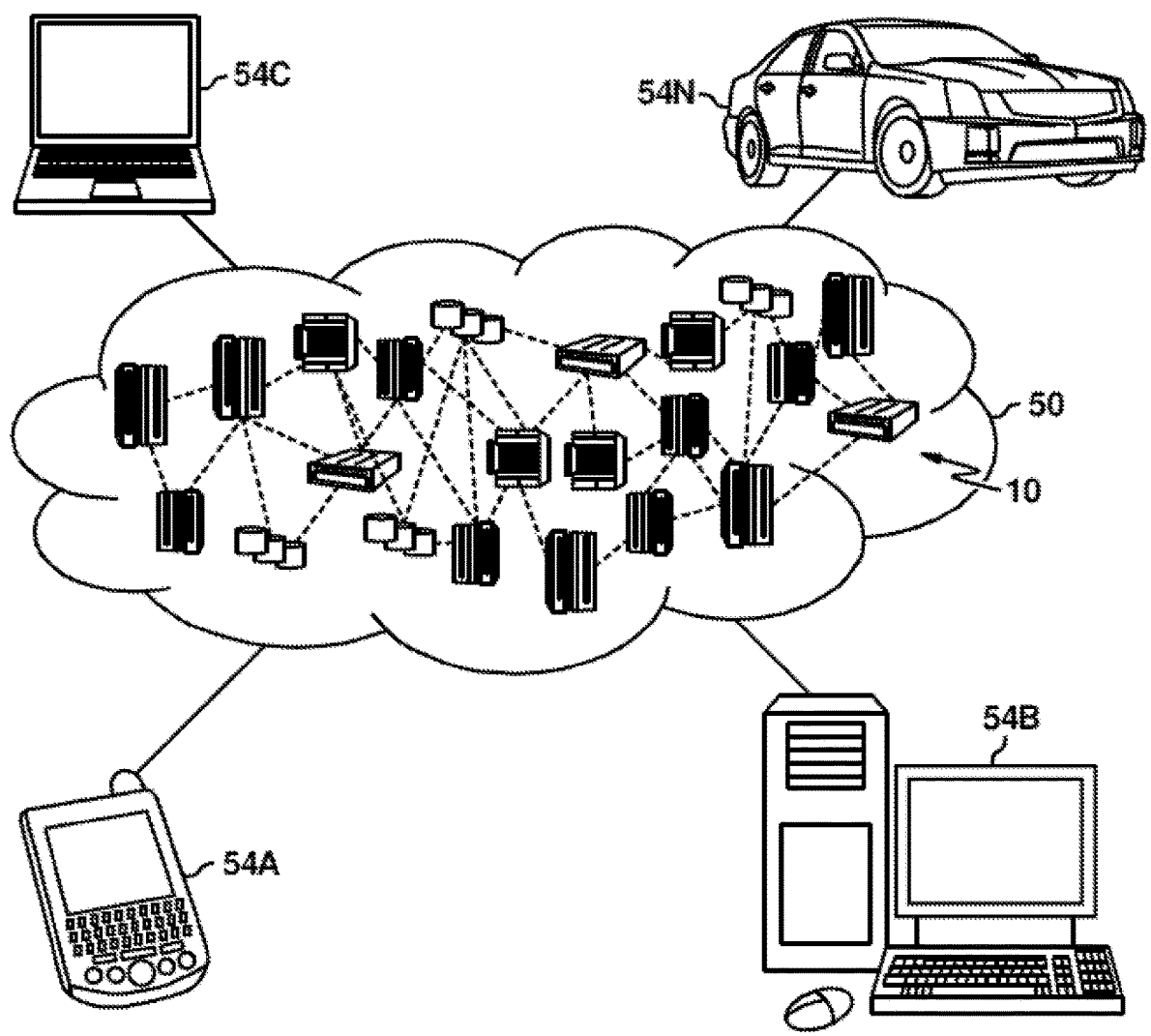
FIG. 7 depicts a cloud computing environment according to at least one embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
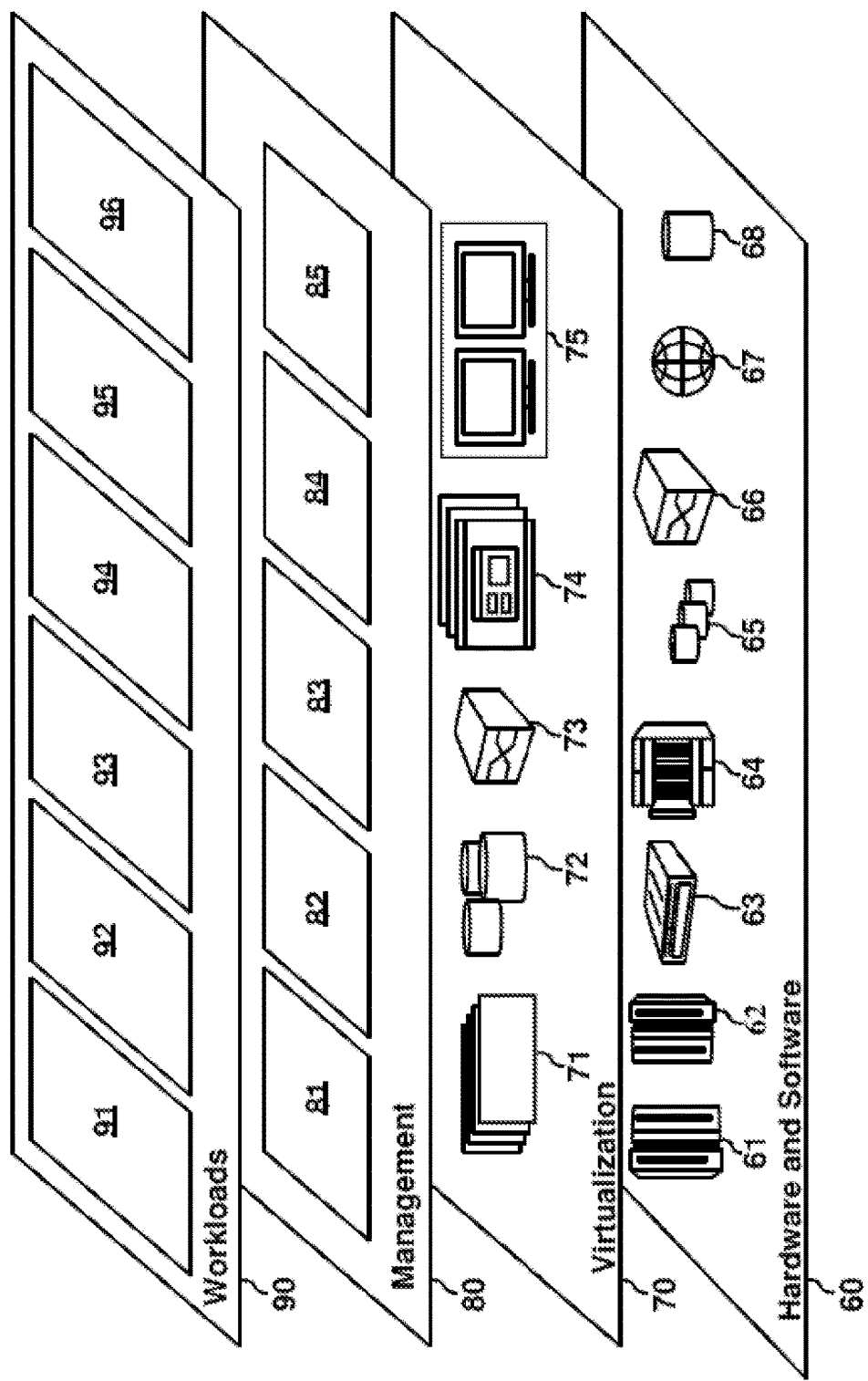
FIG. 8 depicts abstraction model layers according to at least on embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 9:
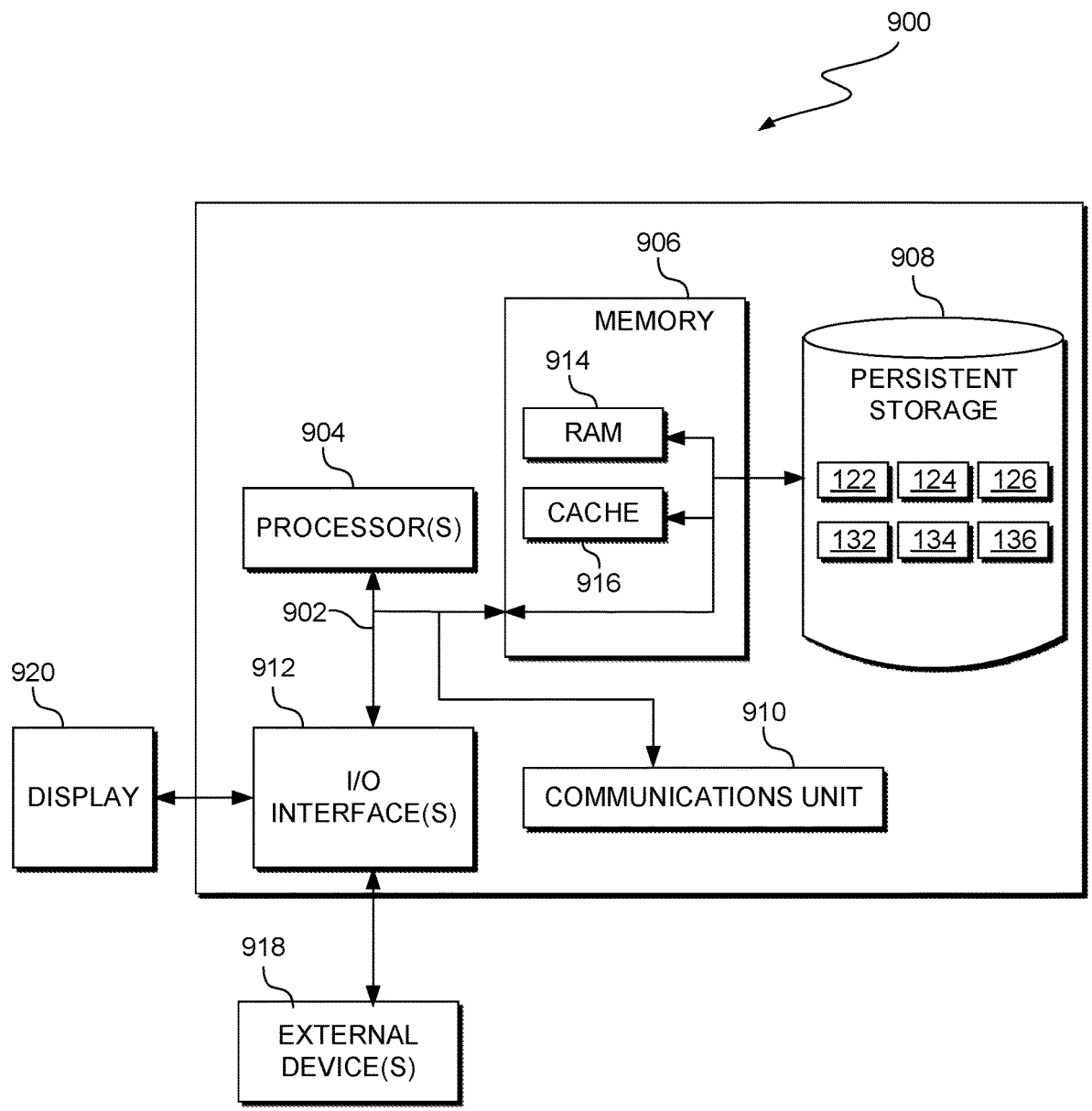
FIG. 9 depicts a block diagram of components of one or more computing devices within the computing environment depicted in FIG. 1, in accordance with an exemplary embodiment of the present invention.

FIG. 9 depicts a block diagram, 900, of components of computer system 120 and client device 130, in accordance with an illustrative embodiment of the present invention. It should be appreciated that FIG. 9 provides only an illustration of one implementation and does not imply any limitations with regard to the environments in which different embodiments may be implemented. Many modifications to the depicted environment may be made.

Computer system 120 and client device 130 includes communications fabric 902, which provides communications between computer processor(s) 904, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 914 and cache memory 916. In general, memory 906 can include any suitable volatile or non-volatile computer-readable storage media.

Deployment optimization program 122, computer interface 124, server workload program 126, database 128, client program 132, client interface 134, client workload program 136, and sensors 138 are stored in persistent storage 908 for execution and/or access by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 910, in these examples, provides for communications with other data processing systems or devices, including resources of network 110. In these examples, communications unit 910 includes one or more network interface cards. Communications unit 910 may provide communications through the use of either or both physical and wireless communications links. Deployment optimization program 122, computer interface 124, server workload program 126, database 128, client program 132, client interface 134, client workload program 136, and sensors 138 may be downloaded to persistent storage 908 through communications unit 910.

I/O interface(s) 912 allows for input and output of data with other devices that may be connected to computer system 120 and client device 130. For example, I/O interface 912 may provide a connection to external devices 918 such as a keyboard, keypad, a touch screen, and/or some other suitable input device. External devices 918 can also include portable computer-readable storage media such as, for example, thumb drives, portable optical or magnetic disks, and memory cards. Software and data used to practice embodiments of the present invention, e.g., deployment optimization program 122, computer interface 124, server workload program 126, database 128, client program 132, client interface 134, client workload program 136, and sensors 138, can be stored on such portable computer-readable storage media and can be loaded onto persistent storage 908 via I/O interface(s) 912. I/O interface(s) 912 also connect to a display 920.

Display 920 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method comprising:
   receiving, by one or more processors, information pertaining to a machine learning workload to be processed for a client device, wherein the workload includes an input image;
   determining, by the one or more processors, to pre-process the input image prior to processing the workload based, at least in part, on the information;
   determining, by the one or more processors, a pre-processing location based, at least in part, on the information;
   determining, by the one or more processors, a machine learning model for the workload and a processing location for the workload based, at least in part, on the information; and
   generating, by the one or more processors, a request to process the workload at the determined processing location utilizing the determined machine learning model.

2. The computer-implemented method of claim 1, wherein the determined processing location is the client device.

3. The computer-implemented method of claim 1, wherein the determined processing location is a server.

4. The computer-implemented method of claim 3, wherein determining the processing location for the workload includes selecting the server from a set of available servers.

5. The computer-implemented method of claim 1, wherein:
   the determined processing location is a server; and
   the determined pre-processing location is the client device.

6. The computer-implemented method of claim 1, further comprising:
   determining, by one or more processors, an output image size for the pre-processing of the input image based, at least in part on the information.

7. The computer-implemented method of claim 1, wherein the information identifies: (i) one or more processing time requirements, and (ii) available processing resources on the client device.

8. The computer-implemented method of claim 7, wherein the information further identifies one or more machine learning model accuracy requirements.

9. The computer-implemented method of claim 7, wherein the information further identifies: (i) that the workload is located at the client device, and (ii) a transmission speed for transmitting the workload between the client device and a server.

10. The computer-implemented method of claim 1, wherein determining the machine learning model for the workload and the processing location for the workload includes computing and optimization function utilizing an integer linear programming method.

11. The computer-implemented method of claim 1, wherein the client device is an autonomous vehicle.

12. The computer-implemented method of claim 11, wherein the workload is selected from the group consisting of: (i) an object detection workload, (ii) an object recognition workload, (iii) a radar positioning workload, (iv) a lidar (light detection and ranging) workload, (v) a spatial detection workload, (vi) an automated parking workload, and (vii) a navigational workload.

13. A computer program product comprising:
   one or more computer-readable storage media and program instructions stored on the one or more computer-readable storage device, the stored program instructions comprising:
   program instructions to receive information pertaining to a machine learning workload to be processed for a client device, wherein the workload includes an input image;
   program instructions to determine to pre-process the input image prior to processing the workload based, at least in part, on the information;
   program instructions to determine a pre-processing location based, at least in part, on the information;
   program instructions to determine a machine learning model for the workload and a processing location for the workload based, at least in part, on the information; and
   program instructions to generate a request to process the workload at the determined processing location utilizing the determined machine learning model.

14. The computer program product of claim 13, wherein determining the processing location for the workload includes determining whether to process the workload on the client device or whether to process the workload on a server.

15. The computer program product of claim 14, wherein the client device is an autonomous vehicle.

16. A computer system comprising:
   one or more computer processors;
   one or more computer readable storage devices; and
   program instructions stored on the one or more computer readable storage devices for execution by at least one of the one or more processors, the stored program instructions comprising:
   program instructions to receive information pertaining to a machine learning workload to be processed for a client device, wherein the workload includes an input image;
   program instructions to determine to pre-process the input image prior to processing the workload based, at least in part, on the information;
   program instructions to determine a pre-processing location based, at least in part, on the information;
   program instructions to determine a machine learning model for the workload and a processing location for the workload based, at least in part, on the information; and
   program instructions to generate a request to process the workload at the determined processing location utilizing the determined machine learning model.

17. The computer system of claim 16, wherein determining the processing location for the workload includes determining whether to process the workload on the client device or whether to process the workload on a server.

18. The computer system of claim 17, wherein the client device is an autonomous vehicle.

* * * * *